(12) United States Patent
Healey

(10) Patent No.: US 7,614,155 B2
(45) Date of Patent: Nov. 10, 2009

(54) FARRIER'S TOOL AND METHOD FOR USING

(76) Inventor: Pete Healey, P.O. Box 704, Los Olivos, CA (US) 93441

( * ) Notice: Subject to any disclaimer, the term of this patent is extended or adjusted under 35 U.S.C. 154(b) by 238 days.

(21) Appl. No.: 11/807,019

(22) Filed: May 24, 2007

(65) Prior Publication Data

US 2008/0289199 A1    Nov. 27, 2008

(51) Int. Cl.
*A01L 11/00* (2006.01)
(52) U.S. Cl. .................. 33/195; 33/471; 168/45
(58) Field of Classification Search .............. 33/195, 33/1 R, 471, 511; 168/45
See application file for complete search history.

(56) References Cited

U.S. PATENT DOCUMENTS

| | | | | |
|---|---|---|---|---|
| 583,706 | A * | 6/1897 | Kearns et al. | 33/195 |
| 659,852 | A * | 10/1900 | Libby | 33/195 |
| 832,060 | A * | 10/1906 | Holmquist | 33/195 |
| 1,497,492 | A * | 6/1924 | Engel | 33/494 |
| 4,214,370 | A * | 7/1980 | Beaston | 33/195 |
| 4,227,311 | A * | 10/1980 | Behney | 33/195 |
| 4,660,293 | A * | 4/1987 | Kovacs | 33/471 |
| 4,771,548 | A * | 9/1988 | Donnery | 33/512 |
| 4,813,148 | A * | 3/1989 | Finnegan | 33/195 |
| 5,027,520 | A * | 7/1991 | Finnegan | 33/195 |
| 5,996,698 | A * | 12/1999 | Behney | 168/48.1 |
| 6,128,824 | A * | 10/2000 | Yang | 33/511 |
| 7,013,981 | B2 * | 3/2006 | Goode | 168/45 |
| 7,165,623 | B2 * | 1/2007 | Healey | 168/45 |
| 2009/0151176 | A1 * | 6/2009 | Healey | 33/195 |

* cited by examiner

*Primary Examiner*—G. Bradley Bennett
*Assistant Examiner*—Tania C Courson
(74) *Attorney, Agent, or Firm*—Laura Tunnell

(57) ABSTRACT

A farrier's tool and a method of using the tool for preparing the hoof of a horse to receive a shoe. The tool is, in one aspect, a goniometer used for determining the angle of heel-toe taper when preparing a horse's hoof to receive a shoe. After the angle between the anterior surface of the first phalanx of the foot and the anterior surface of the hoof is determined, the ground-facing surface of the hoof is beveled by means of a trimming tool at an angle determined by the goniometer to reduce uneven pressure on the underlying coffin bone and to balance the tension on the tendons and ligaments in the horse's foot, particularly during locomotion. The method provides, inter alia, means for accurately aligning the hoof capsule with the coffin bone in the hoof.

1 Claim, 1 Drawing Sheet

FARRIER'S TOOL AND METHOD FOR USING

BACKGROUND OF THE INVENTION

1. Field of the Invention

The present invention relates generally to a farrier's tool and a method for preparing the hoof of a horse for receiving a shoe, and more particularly, to a measuring tool operable for determining the optimal angle of the plane of the ground-facing surface of the hoof with respect to the alignment of bones in the horse's foot, the angle thus determined enabling the farrier to properly bevel the horse's hoof in preparation for receiving a shoe.

2. Prior Art

Horses need periodic shoeing to protect their hooves and prevent damage to their feet. Typically, the wear and tear on the shoe and the normal growth and expansion of the hoof requires filing, trimming and reshoeing every six to eight weeks. In accordance with the prior art, prior to installing a horseshoe, the farrier first removes the old shoe then determines the flatness and the plane of the bottom, ground-contacting portion of the hoof (i.e., the solar surface of the hoof). The farrier then makes corrections by peeling, cutting and/or filing to shape and flatten the bottom of the hoof. The width of the hoof is then measured and the correct horseshoe selected, shaped as required, and placed against the corrected bottom of the hoof and nailed thereto.

Errors in shoeing can lead to damage to the horse's leg and foot. The horse's feet and legs can become damaged if unnecessary strain is placed on components of the foot such as bones, tendons, ligaments and the like, which may cause the horse to go lame. The prior art method for preparing the hoof of a horse for shoeing pays particular attention to the lateral width and flatness of the foot. U.S. Pat. No. 4,813,148 discloses a device and method for determining the flatness of a horse's hoof and for making corrections therein. U.S. Pat. No. 5,996,698 discloses a farrier rasp that includes means for measuring the width of a horse's hoof at the same time the hoof is being filed and shaped for shoeing, thereby avoiding the necessity for the additional step of lifting the foot of the horse to measure it with a different instrument after filing.

Notwithstanding the importance of the flatness of the foot, the contour of the anterior (or forward) portion of the toe of the hoof is also important. A particular problem that may result from improper horseshoeing is injury to the coffin bone in the foot arising from pressure exerted by the hard, horny overlying hoofwall away from the coffin bone. When a horse lifts its hoof to walk, the heel leaves the ground first, temporarily transferring weight to the toe. The rising foot rotates around a transverse axis in the foot which is called the break-over axis. If the forward portion of the toe (or shoe) is flat, the weight transferred thereto creates a high torque which forces the hoofwall away from the coffin bone which can result in damage thereto. The present inventor, in U.S. Pat. No. 7,165,623, provides a device and a method for identifying the portion of the hoof forward of the break-over plane and for tapering or beveling the forward edge of the lower, ground-contacting surface of the hoof such that the pressure exerted by the hoofwall and the coffin bone is evenly distributed over the interface therebetween, particularly when the horse is walking or running.

It is an important, but rarely recognized, aspect to shoeing a horse that the plane of contact of the hoof with the ground is such that torque on the hoof and the bones of the foot is minimized when the hoof is weight-bearing such as when the horse is standing or moving. The correct angle of the plane of contact of the hoof with the underlying surface depends on the relative placement of bones in the horse's foot which is more or less individual to the animal. There is a need for a method for preparing a horse's hoof for receiving a shoe that accurately determines the plane of contact of the hoof with the underlying (i.e., supporting) surface for each hoof of the horse and enables the farrier to bevel the hoof to provide the correct angle of bevel for each hoof of a particular horse prior to nailing the shoe to the hoof.

SUMMARY

The present invention is directed to the provision of a farrier's tool operable for determining the correct angle to bevel the lower, ground-facing surface of a hoof of a horse in order to minimize the torque on the bones and ligaments of the foot when the hoof is bearing weight. To achieve these and other advantages and in accordance with the purpose of the invention which is to substantially obviate one or more of the limitations of the related art as embodied and broadly described herein, the invention includes a (preferably transparent) goniometer and a method for using the goniometer to determine the correct angle for trimming the lower ground-facing surface of the hoof prior to attaching a shoe thereto. In a preferred embodiment, the goniometer, which comprises two articulated arms pivotally connected to one another at a center portion thereof, is operable for measuring the angle between the anterior surface of the horse's leg and the anterior surface of the hoof, the anterior surface of the hoof being substantially parallel to the anterior surface of the third phalanx (coffin bone) in the horse's foot. In the preferred embodiment of the farrier's tool, the goniometer, when straightened, provides a ruler having a hole in the center thereof. Sequential gradations are disposed on the ruler, with gradations increasing symmetrically from zero to about 80 mm in each direction laterally from the center of the hole. The preferred embodiment of the farrier's tool of the present invention enables the farrier to determine both the correct angle for beveling the hoof and the break-over plane for trimming and contouring the forwardmost portion of the hoof.

It has been found that the preferred angle between the hard anterior surface of a horse's hoof and the portion of the horse's foot anterior to the first phalanx is ~−10 degrees. The method for preparing a horse's hoof to receive a shoe in accordance with the present invention includes the steps of: (a) placing a lower arm of the goniometer against the anterior surface of the hoof such that the point of articulation (i.e., the center hole) of the goniometer is approximately adjacent the superior or uppermost portion of the hoof (i.e., the coronet band), and an opposing upper arm of the goniometer is parallel to the portion of the horse's foot anterior to the first phalanx thereof; (b) measuring the angle $\Theta$ between the upper arm and the lower arm of the goniometer; then (c) computing an angle of bevel $\omega$ wherein $\omega = k(\Theta - 10°)$, $k=$ a constant having a value of ~0.4; then beveling the ground-facing surface of the hoof an angle $\omega$.

The features of the invention believed to be novel are set forth with particularity in the appended claims. However the invention itself, both as to organization and method of operation, together with further objects and advantages thereof may be best understood by reference to the following description taken in conjunction with the accompanying drawings.

DESCRIPTION OF THE PREFERRED EMBODIMENT

Figure 1:
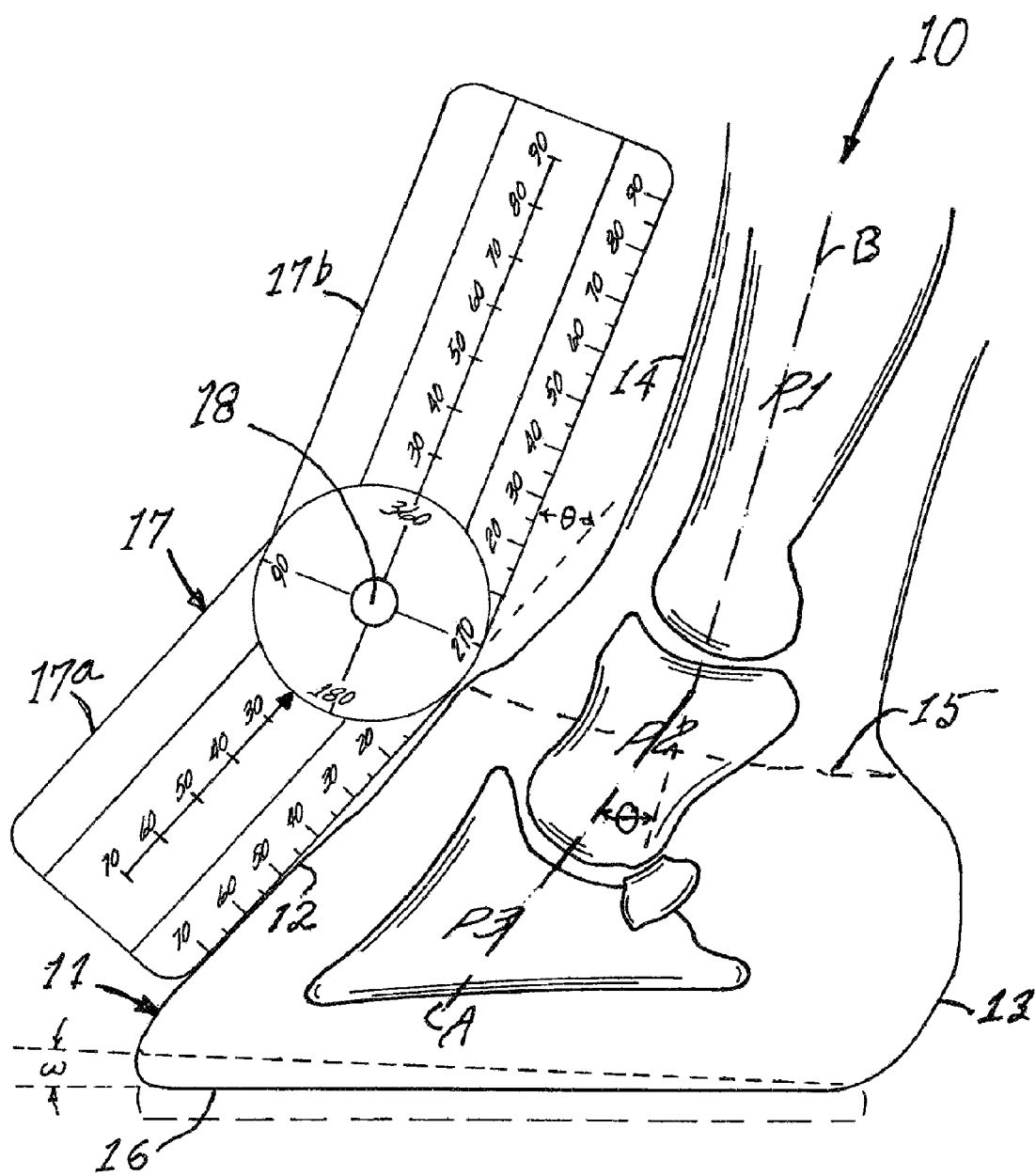
FIG. 1 is a cross-sectional view of the foot of a horse illustrating the anatomical relationship between the bones of the foot and the hoof.

Turning now to FIG. 1, the anatomy of the foot 10 of an unshod horse is shown in longitudinal cross-sectional view. The hoof 11 has an anterior or forward edge 12 and a heelbulb 13 on the rearward edge. The junction between the upper surface of the hoof 11 and the skin 14 is the coronet band 15. In addition to the bottom surface 16 of the hoof 11 being flat, the contour of the anterior (or forward) portion 16 of the hoof 12 is also important. When a horse lifts its hoof to walk, the heel leaves the ground first, temporarily transferring weight disproportionately to the anterior or forward edge 16 of the hoof. The rising foot rotates around a transverse axis in the foot which is called the break-over axis. If the lower surface of the forward portion of the hoof (or shoe) is flat, the weight transferred thereto creates a high torque which forces the hoofwall away from the coffin bone P3 which can result in damage thereto. In U.S. Pat. No. 7,165,623, the content of which is incorporated herein by reference thereto, the present inventor has previously disclosed a method for determining the correct contour for trimming the forward portion of the hoof prior to affixing a shoe to the hoof.

With continued reference to FIG. 1, the bones of the foot 10 of a horse include a first phalanx P1, a second phalanx P2 and a third phalanx or coffin bone P3. The alignment of P2 and P3 is indicated by axis A, and the orientation of P1 is indicated at axis B. It has been determined that the optimal angle $\Theta$ between A1 and A2 is ~-10°. If $\Theta$ is -10°, the alignment of bones P1, P2 and P3 is optimal for minimizing unbalanced torque on the tissues of the foot 10 when the foot is load-bearing.

It is important to note that the orientation of axis A is variable. Bones P2 and P3 have a joint therebetween and can move with respect to one another. Accordingly, the bevel angle $\omega$ is different than $\Theta-10°$. For example, if the lower arm 17a of a goniometer 17 is placed against the forward surface of the hoof 12, as shown in FIG. 1, and the opposing upper arm 17b is pivotally adjusted such that it is parallel to P1, and the measured angle $\Theta$ between the upper and lower arms of the goniometer is -20°, it is found that a bevel angle $\omega$ of 4° will provide an angle of -10° between axes A and B after realignment of bones P2 and P3 relative to one another when the horse puts its weight on the hoof. If $\Theta$ is less than -10°, the bevel angle $\omega$ will be such that the heel of the hoof is wedged or lifted relative to the toe of the hoof by an angle $\omega=0.4(\Theta-10°)$. If the measured angle $\Theta$ is greater than -10°, for example, -5°, angle $\omega$ will be such that the toe of the hoof is wedged or lifted relative to the heel of the hoof by an angle $\omega=0.4(\Theta-10°)$.

In accordance with another aspect of the invention, it has been shown by the present inventor in U.S. Pat. No. 7,165,623 that the measurement of the break-over point in a horse's foot comprises a means for properly contouring the leading, forwardmost end of a hoof. The goniometer 17 of the present invention has a hole 18 in the centerpoint thereof disposed within the pivotal attachment means 19 connecting the upper 17b and lower arms 17a of the goniometer 17 to one another. The pivotal attachment means is preferably an annular or semiannular ridge on one of the arms that slidingly engages an annular or semiannular groove in the opposing arm. The upper and lower arms 17b and 17a respectively each have equally spaced graduations (visual indicia) thereon spaced by 1-5 mm from adjacent graduations and increasing in numerical value symmetrically from the hole 18 in the center. In FIG. 1, the smaller, more closely spaced gradations have been omitted for clarity. When the goniometer 17 is straightened (i.e., $\Theta=0$), the goniometer 17 can be employed to determine the break-over point in the hoof in accordance with the method disclosed in the aforesaid U.S. Pat. No. 7,165,623.

While particular embodiments of the present invention have been illustrated and described, it would be obvious to those skilled in the art that various other changes and modifications can be made without departing from the spirit and scope of the invention. The tool and method of the present invention provides the farrier with means for determining the correct bevel angle of the hoof such that when the hoof is beveled in accordance with the present method, the alignment of the bones in the horses foot is optimized to minimize unbalanced stress on the tissues of the foot when the foot is weight-bearing. It is therefore intended to cover in the appended claims all such changes and modifications that are within the scope of this invention.

What I claim is:

1. A method for enabling a farrier to determine the correct angle to bevel the bottom ground-facing surface of a hoof of a horse such that unbalanced stress on tissues within the horse's foot is minimized when the foot is bearing the horse's weight, said hoof having a forwardmost surface extending upwardly from said ground-facing surface of the hoof to a coronet band in the foot, the method comprising the steps of: (a) presenting a goniometer; then (b) placing a first edge of said goniometer against the forwardmost surface of the horse's hoof; then (c) pivoting said opposing edge of said goniometer until said opposing edge is parallel to a vertical portion of the horse's foot anterior to the first phalanx thereof; then (d) measuring the angle $\Theta$ between said first edge and said opposing edge; then (e) beveling the ground-facing surface of the hoof such that when the foot is weight-bearing, the angle $\Theta$ is about -10 degrees.

* * * * *